(12) United States Patent
Murano

(10) Patent No.: US 7,850,370 B2
(45) Date of Patent: Dec. 14, 2010

(54) POSITIONAL DIFFERENTIATING CONNECTOR ASSEMBLY

(75) Inventor: Adam Murano, Lebanon, CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 12/428,878

(22) Filed: Apr. 23, 2009

(65) Prior Publication Data

US 2009/0245732 A1    Oct. 1, 2009

Related U.S. Application Data

(62) Division of application No. 11/832,295, filed on Aug. 1, 2007, now Pat. No. 7,540,667.

(51) Int. Cl.
*G02B 6/38* (2006.01)

(52) U.S. Cl. .......................................... 385/60; 385/59

(58) Field of Classification Search .............. 385/53–94
See application file for complete search history.

(56) References Cited

U.S. PATENT DOCUMENTS

| | | |
|---|---|---|
| 4,076,361 A | 2/1978 | Campbell |
| 4,531,798 A | 7/1985 | Baur et al. |
| 4,596,436 A | 6/1986 | Kraemer et al. |
| 4,764,129 A | 8/1988 | Jones et al. |
| 4,781,626 A | 11/1988 | Lazarchik |
| 4,875,753 A | 10/1989 | Kalomiris |
| 5,044,994 A | 9/1991 | Van Woensel |
| 5,167,542 A | 12/1992 | Haitmanek |
| 5,244,402 A | 9/1993 | Pasterchick, Jr. et al. |
| 5,274,729 A | 12/1993 | King et al. |
| 5,335,301 A | 8/1994 | Newman et al. |
| 5,363,460 A | 11/1994 | Marazzi et al. |
| 5,420,951 A | 5/1995 | Marazzi et al. |
| 5,423,692 A | 6/1995 | Francis |
| 5,506,922 A | 4/1996 | Grois et al. |
| 5,521,997 A | 5/1996 | Rovenolt et al. |
| 5,553,180 A | 9/1996 | Belenkiy et al. |
| 5,726,424 A | 3/1998 | Koether |
| 5,729,644 A | 3/1998 | Shiflett et al. |

(Continued)

FOREIGN PATENT DOCUMENTS

CA    2441872    3/2005

(Continued)

OTHER PUBLICATIONS

AMP SDL Top-Entry and Side-Entry PC Board Receptacles, Application Specification 14-2081, Mar. 26, 1996, pp. 1-11.

(Continued)

*Primary Examiner*—Daniel Petkovsek
(74) *Attorney, Agent, or Firm*—McCarter & English, LLP

(57) ABSTRACT

The present disclosure provides a method for securing a plurality of communications channels, said method comprising: providing a plurality of data outlets, providing a patch cord connector assembly, providing access to a permissible data channel of the plurality of data channels, and restricting access to a restricted data channel of the plurality of data channels. A plurality of pitches are used to space apart optical communications components, wherein a patch cord connector assembly is both capable of mating with a data outlet associated with a permissible data channel, and incapable of mating with a data outlet associated with a restricted data channel.

7 Claims, 4 Drawing Sheets

U.S. PATENT DOCUMENTS

| | | | |
|---|---|---|---|
| 6,019,521 | A | 2/2000 | Manning et al. |
| 6,081,647 | A | 6/2000 | Roth et al. |
| 6,130,977 | A | 10/2000 | Rosson |
| 6,149,313 | A | 11/2000 | Giebel et al. |
| 6,179,477 | B1 | 1/2001 | De Marchi |
| 6,200,040 | B1 | 3/2001 | Edwards et al. |
| 6,224,268 | B1 | 5/2001 | Manning et al. |
| 6,247,850 | B1 | 6/2001 | Edwards et al. |
| 6,305,955 | B1 | 10/2001 | Billman |
| 6,354,746 | B1 | 3/2002 | Lee |
| 6,357,930 | B1 | 3/2002 | Wiltjer |
| 6,383,032 | B1 | 5/2002 | Gerberding |
| 6,422,759 | B1 | 7/2002 | Kevern |
| 6,435,730 | B1 | 8/2002 | Kevern et al. |
| 6,471,416 | B2 | 10/2002 | Lu |
| 6,554,495 | B1 | 4/2003 | Zhu et al. |
| 6,685,362 | B2 | 2/2004 | Burkholder et al. |
| 6,688,780 | B2 | 2/2004 | Duran |
| 6,852,386 | B2 | 2/2005 | Nadexhdin et al. |
| 6,910,807 | B2 | 6/2005 | Lu |
| 6,960,025 | B2 | 11/2005 | Gurreri |
| 7,086,878 | B2 | 8/2006 | Mine et al. |
| 7,118,286 | B2 | 10/2006 | Gurreri et al. |
| 7,182,523 | B2 | 2/2007 | Abendschein et al. |
| 7,207,724 | B2 | 4/2007 | Gurreri |
| 7,258,493 | B2 | 8/2007 | Milette |
| 7,390,203 | B2 | 6/2008 | Murano et al. |
| 7,540,667 | B2 | 6/2009 | Murano |
| 7,699,533 | B2 * | 4/2010 | Milette ..................... 385/75 |
| 2005/0117850 | A1 | 6/2005 | Milette |
| 2005/0135752 | A1 | 6/2005 | Kiani et al. |
| 2005/0176308 | A1 | 8/2005 | Gurreri |
| 2005/0220434 | A1 | 10/2005 | Hsieh |
| 2006/0063436 | A1 | 3/2006 | Gurreri et al. |
| 2008/0090433 | A1 | 4/2008 | Murano et al. |

FOREIGN PATENT DOCUMENTS

| | | |
|---|---|---|
| WO | 2005/029147 | 3/2005 |
| WO | WO 2005/029147 | 3/2005 |

OTHER PUBLICATIONS

Tyco Electronics Fiber Optics Products Catalog 1307895, Revised Mar. 2006, pp. 6, 8-13.

* cited by examiner

POSITIONAL DIFFERENTIATING CONNECTOR ASSEMBLY

CROSS-REFERENCE TO RELATED APPLICATION

This application is a divisional application of a co-pending, non-provisional patent application entitled "Positional Differentiating Connector Assembly," filed on Aug. 1, 2007 and assigned Ser. No. 11/832,295. The entire contents of the foregoing non-provisional patent application are incorporated herein by reference.

BACKGROUND

1. Technical Field

The present disclosure relates to systems and methods for securing a fiber optic network assembly through a positional differentiating connector and adapter solution.

2. Background Art

Many transactions take place everyday over the Internet, increasing a need for secure Ethernet communications. Typically, network security is handled in an Ethernet's layers 2-7, providing packet encryption and decryption algorithms up to 256 bit, which is generally considered virtually unbreakable by mathematicians and programmers alike. Although these security techniques have generally been successful in preventing a non-physical security breach, they do not prevent physical tampering or access to secure data channels. For example, encryption and decryption algorithms do not prevent a person internal to an organization from gaining physical access to secure data channels from which said person is restricted. A person having a low level security clearance can sit at another person's workstation who has a higher level of security clearance and thereby access data or information restricted from said individual.

Keyed solutions are effective for preventing additional forms of undesired network access/connection other than to protect against security breach. Keyed solutions are effective in preventing accidental access/connections associated with a particular network system or environment. This prevents access when no vicious or malicious intent existed to access a particular data stream or network. Ultimately, a keyed solution prevents a casual user from accessing an incorrect network.

To combat security breach, companies and military bases alike promote isolated networks in the premise environment starting at the data center or main computer room. The use of keying connectors at the user workspace or computer terminal is rapidly becoming a preferred method for preventing or controlling connectivity or access to a secure network.

In a keyed connector scenario, an environment, such as a secure finance center at an insurance company or a military installation such as the Pentagon, is universally equipped with keyed fiber optic adapters at each user workstation. As used herein, the term "adapter" is interchangeable with the term "coupler" and refers to a device that creates a connection between two fiber optic ferrules, each containing a light carrying medium of fiber. An adapter typically contains a ceramic or phosphorous bronze alignment sleeve and a number of features/structures that facilitate latching the connector into the adapter. A MT-RJ adapter, however, does not include an alignment sleeve; rather, the fibers are aligned by precision pins and holes on the mating connector ferrules.

In a non-secured environment, a user of a network is typically provided with a generic patch cable to attach a laptop or desktop to a network. Thus, the generic patch cable can generally interface with any available data port in a building and provides connectivity to the user's work station computer or laptop. In a typical secured environment, a network designer seeks to isolate aspects of the network, e.g., by providing a different connector configuration to each of the network security levels. For example, a user is given a patch cable commensurate with the user's assigned security level. If the user attempts to insert the given connector/patch cable into any adapter other than one designed for it, the connector will not fit and a network connection will not be made. Typically, in such implementations, network connection is prevented because the connector will not engage the adapter to the full depth. A network connection will only be made when a matching connector and adapter are mated. Generally, the mechanism preventing the light from moving from one connector to the other is a gap between the two fibers. To be clear, the gap is created because the two ferrule end faces are held at a sufficiently preventative distance from each other if the keys are not compatible. These keyed connectors are typically color coded so as to indicate different security levels and/or differentiate networks.

Current exemplary keyed connector systems are described in Canadian Patent Application No. 2,441,872, U.S. Pat. Nos. 6,960,025 and 7,207,724, and U.S. Patent Publication No. 2005/0117850. These patents/publications provide for unique connector-to-adapter interface geometries through a key-and-slot methodology. Particularly, these patents/publications disclose embodiments wherein a boss defined on an asymmetric circle is adapted to mate with an asymmetric key having a protrusion that is adapted to effectively fit with the appropriate boss.

Despite efforts to date, a need exists for effective secured connector systems and solutions capable of preventing physical network access with unauthorized patch cords. These and other needs are addressed and/or overcome by the assemblies and methods of the present disclosure.

SUMMARY

The present disclosure provides effective systems and methods for achieving a positional differentiating connector fiber network. In an exemplary embodiment, a communications connector system associated with the present disclosure includes at least a first connector assembly including a patch cord terminated at least at one end by a duplex connector. The duplex connector includes: (i) a connector housing clip adapted to enclose and securely position at least a portion of the terminated end of the patch cord and at least a portion of each of a pair of ferrule housings; and (ii) a pair of connector subassemblies. Each subassembly defines an inner cavity that is configured and dimensioned to allow a ferrule mounted with respect to one of the pair of ferrule housings to pass through the connector subassembly and each of the subassemblies extend outwardly with respect to the connector housing clip and the ferrule housings.

The subassemblies are adapted to securely mate with a corresponding pair of receptacles associated with an adapter. In an exemplary embodiment, a first adapter includes a housing defining a width that is dimensioned to host a pair of receptacles that are spaced apart with respect to each other. The width is generally selected so as to accommodate receptacle spacing of up to 3 p. The pair of receptacles are positioned within a face of each adapter and are adapted to mate with the pair of connector subassemblies. The pair of connector subassemblies are spaced apart a particular pitch value (p) and the pair of corresponding receptacles are spaced apart an equal pitch value (p).

According to the present disclosure, pitch value (p) is defined such that "1 p" corresponds to the spaced apart distance between center lines passing through ferrules associated with an industry standard duplex connector/adapter. In an exemplary embodiment associated with the present disclosure, the pitch value (p) associated with the spacing of a connector and/or an adapter assembly is not equal to one. For purposes of the present disclosure, the term "receptacle" may be used interchangeably with one or both of the terms "port" and "cavity" to the extent the context so permits.

Typically, the adapter corresponds to a particular network and each receptacle associated with the inner cavity defines an optical pathway to allow optical from the corresponding mating connector assembly and the network. Exemplary receptacles associated with the adapter each include a ferrule alignment sleeve adapted to receive and align the ferrule to facilitate communication between the connector assembly and the corresponding network.

In further exemplary embodiments, each connector subassembly includes a trigger feature formed on a top surface of the subassembly extending rearwardly and upwardly with respect to the top surface of the subassembly. The housing clip further includes a thumb clip formed on a top surface of the housing clip extending forwardly and upwardly with respect to the top surface of the housing clip. The thumb clip is adapted to simultaneously depress each of the trigger features associated with each of the pair of subassemblies. In an even further exemplary embodiment, each connector subassembly includes a push-pull latching mechanism for inserting and securing the connector with respect to the adapter. A push-pull latching mechanism is typically utilized with respect to an MU connector and/or an SC connector.

The present disclosure provides for systems wherein the pitch value (p) ranges up to 3 p. In an exemplary embodiment, the patch cord is a zip cord and is split into two independent leads, each terminated by a single fiber connector and then retained in a duplex clip. The patch cord is typically a fiber optic patch cord adapted to facilitate communication within a fiber optic network. Each of the receptacles of the adapter may further include a protruding boss feature and each of the subassemblies define a relief adapted to cooperate with the protruding boss feature.

The present disclosure provides for a communications connector system including a plurality of adapters. Each adapter corresponds to a particular information network and is adapted to mate with a particular connector assembly. Each connector assembly includes a cord terminated at least at one end by a duplex connector. Exemplary duplex connectors include: (i) a connector housing clip adapted to enclose and securely position at least a portion of the terminated end of the cord and at least a portion of each of a pair of ferrule housings; and (ii) a pair of connector subassemblies, each subassembly defining an inner cavity to allow a ferrule mounted with respect to one of the pair of ferrule housings to pass through the connector subassembly, each of the subassemblies extend outwardly with respect to the connector housing clip and the ferrule housings and are adapted to securely mate with a corresponding pair of receptacles.

Each adapter generally includes a housing defining a width that is dimensioned to host a pair of receptacles that are spaced apart with respect to each other. The width is generally selected so as to accommodate receptacle spacing of up to 3 p. The pair of receptacles are positioned within a face of each adapter and are adapted to mate with the pair of connector subassemblies. Each pair of connector subassemblies and each pair of corresponding receptacles are spaced apart a particular pitch value (p). Each of the plurality of connector assemblies will mate and cooperate with a corresponding pair of receptacles spaced apart an equal pitch value (p).

In an exemplary embodiment, each of the plurality of adapters and corresponding connector assemblies include receptacles and subassemblies spaced apart a different pitch value (p) from any other pair of adapters and corresponding connector assemblies of the plurality of adapters and connector assemblies. In a further exemplary embodiment, each pitch value (p) associated with each spaced apart pair of receptacles and corresponding subassemblies is in a range from about 1 p to about 3 p.

The present disclosure provides systems that include a wall plate hosting a plurality of adapters. Each of the plurality of adapters advantageously includes a pair of receptacles spaced apart a different pitch value (p) from any other adapter of the plurality of adapters. In an exemplary embodiment, the wall plate includes at least three adapters. In a further exemplary embodiment, one of the three adapters is a 1.5 p adapter defining a 1.5 p spacing between each receptacle of the pair of receptacles, another of the three adapters is a 2 p adapter defining a 2 p spacing between each receptacle of the pair of receptacles, and another of the three adapters is a 2.5 p adapter defining a 2.5 p spacing between each receptacle of the pair of receptacles.

In an exemplary embodiment, the plurality of adapters can be included in a member selected from the group consisting of modular cassettes and patch panels. The plurality of connector assemblies can be included in a cord system selected from the group consisting of a patch cable system, a trunk cable system and a horizontal cabling system.

Typically, each of the plurality of adapters corresponding to a particular information network facilitates communication between a corresponding connector assembly and the network when mated with the particular adapter. In an exemplary embodiment, each of the adapters and corresponding connector assemblies are marked with a corresponding visual identification selected from the group consisting of color, alphanumeric, symbol and combinations thereof.

The present disclosure provides a method for securing a communications network system, including the steps of: (a) providing a plurality of adapters, each adapter corresponding to a particular information network and each adapter includes a pair of receptacles hosted within a housing defining a width that is dimensioned to host the pair of receptacles that are spaced apart with respect to each other, the width is selected so as to accommodate receptacle spacing of up to a pitch value of 3 p; (b) providing a plurality of patch cord connector assemblies, each patch cord connector assembly includes a patch cord terminated at least at one end by a duplex connector, the duplex connector includes: (i) a connector housing clip adapted to enclose and securely position at least a portion of the terminated end of the patch cord and at least a portion of each of a pair of ferrule housings; and (ii) a pair of connector subassemblies, each subassembly defining an inner cavity to allow a ferrule mounted with respect to one of the pair of ferrule housings to pass through the connector subassembly, each of the subassemblies extend outwardly with respect to the connector housing clip and the ferrule housings and are adapted to securely mate with a corresponding pair of receptacles associated with a corresponding adapter; and (c) spacing apart each of the pair of connector subassemblies and each of the pair of corresponding receptacles particular pitch value (p). Each of the plurality of connector assemblies will mate and cooperate with a corresponding pair of receptacles spaced apart an equal pitch value (p).

Additional features, functions and benefits of the disclosed systems and methods will be apparent from the description which follows, particularly when read in conjunction with the appended figures.

BRIEF DESCRIPTION OF THE DRAWINGS

To assist those of ordinary skill in the art in making and using the disclosed systems and methods, reference is made to the appended figures, wherein.

DESCRIPTION OF EXEMPLARY EMBODIMENT(S)

Figure 1:
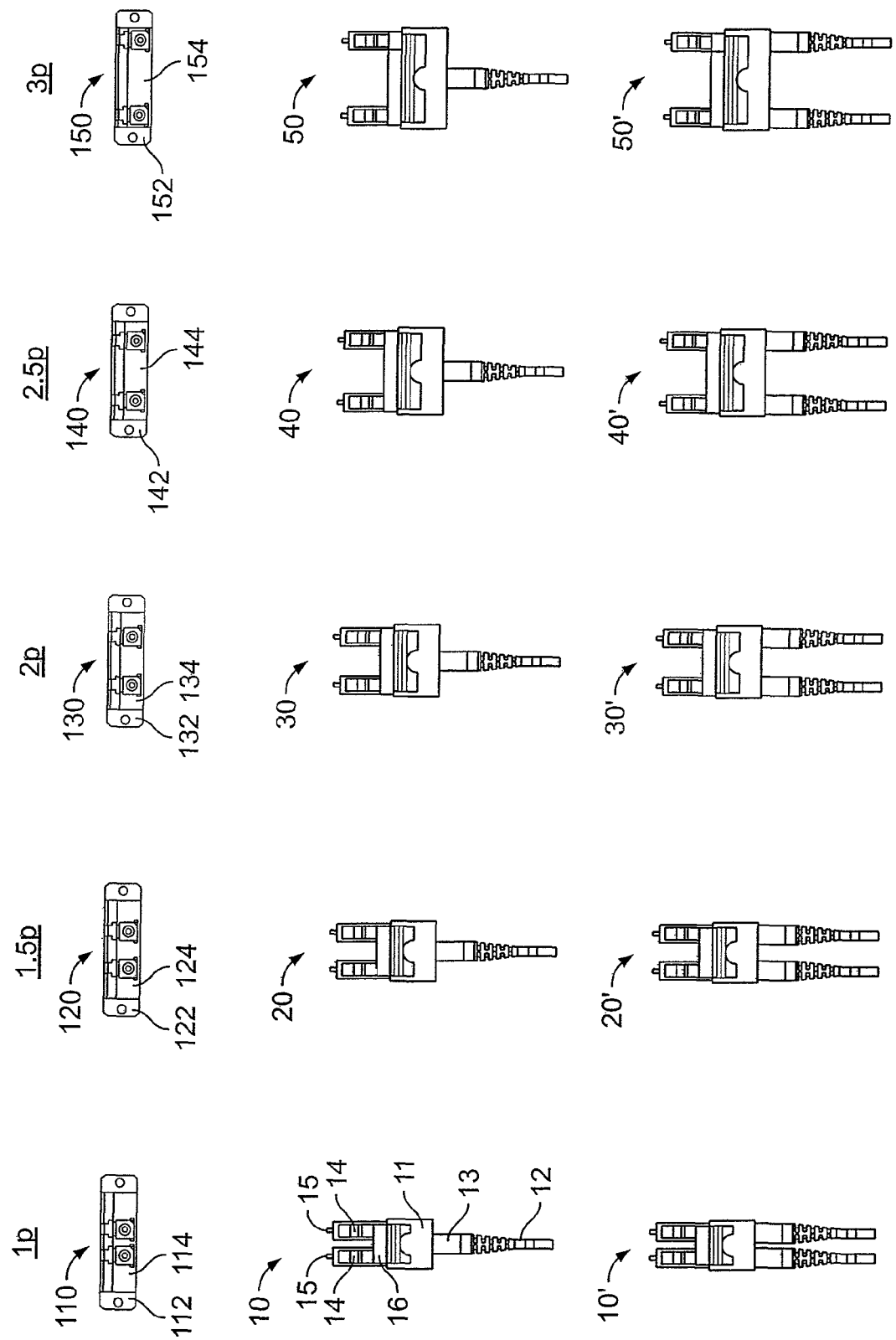
FIG. 1 is a schematic illustrating a plurality of exemplary connector assemblies and adapters associated with the present disclosure.

The present disclosure provides assemblies and methods that include, inter alia, positional differentiating fiber optic connector and adapter assemblies for isolating secure networks. In an exemplary embodiment, this differentiation is achieved using standard, non-keyed LC connectors having a duplex clip assembly. A duplex clip assembly arrangement offers at least the following two particular advantages:

(i) The duplex clip is adapted to hold two connectors having a predetermined relationship for transmitting and receiving optical data signals. Accordingly, the duplex clip provides for a transmit connector and the receive connector positioned in a fixed side by side relationship. This prevents an operator and/or user of the duplex assembly from connecting to a network in a polarity scheme that will not transmit data; and (ii) The duplex clip assembly arrangement can be utilized to control the span or pitch between the two side by side connectors. Controlling the span/pitch between the two side by side connectors allows for the limiting of possible connections that may be made with special pitch adapters.

Existing systems utilize a duplex arrangement of connectors mating with an adapter or coupler. The adapter or coupler, typically referred to as a duplex adapter, includes at least a pair of receptacles (often referred to as ports or jacks) adapted to receive the duplex connector. In an effort to increase connector density, a four receptacle or Quad adapter is used that includes four side by side receiving receptacles formed in a single housing. Typically, the adapters associated with the present disclosure include a first and second section, each defining openings adapted to receive a fiber optic connector and each opening facing opposite directions like 2 mirror images. The sections can be ultra-sonically welded or glued together. In a particular embodiment, before they are welded together, a manufacturer inserts ceramic alignment sleeves in the receptacles from behind.

With reference to the quad adapter, generally, the four receptacles are distinguished into two pairs: a first side by side pair corresponding to a first network and a second side by side pair corresponding to a second network. Each pair is adapted to receive and/or mate with a single duplex connector. One of the receptacles of each pair of receptacles is typically a transmission receptacle and the other receptacle of the pair is a receiving receptacle.

In an exemplary embodiment, the quad adapter includes a housing having a first receptacle side and an opposite second receptacle side. Each receiving side defines four receptacles. Each receptacle is sized and shaped to securely receive a fiber optic connector and includes an internal alignment sleeve defining an optical pathway. The alignment sleeve is adapted to align a ferrule included on the mating fiber optic connector to facilitate optical communication between two connectors. Each connector is securely received by oppositely aligned receptacles. Typically, the spacing between receptacles within a housing is represented by a pitch value (p). In a standard two receptacle adapter or quad adapter, adjacent receptacles are positioned at p=1. Thus, in a quad adapter, the distance between the two outermost receptacles is represented by p=3.

The present disclosure provides for a system that is effective in securing a multiport fiber optic connector assembly. In an exemplary embodiment, a system according to the present disclosure includes a patch cord connector assembly. The connector assembly, includes a patch cord terminated at both ends by a duplex connector. A user entering a security environment may be provided with a connector assembly corresponding to that individual's designated level of security access. The assembly includes: (a) a first end terminated by a duplex connector adapted to plug into the user's electronic device (e.g. a laptop computer); and (b) a second end terminated by a distinct duplex connector sized and shaped to only mate and/or cooperate with an appropriate jack or adapter.

Each level of security clearance corresponds to a unique duplex connector assembly. Each unique duplex connector assembly includes a pair of individual connectors spaced apart by a predetermined corresponding pitch value (p). Each uniquely pitched duplex connector assembly corresponds to a receiving adapter. Each receiving adapter corresponds to an appropriate network. When an appropriate duplex connector assembly is mated with an appropriate adapter, communication with the corresponding network is achievable.

Referring to FIG. 1, exemplary adapters uniquely pitched are shown. Each adapter (e.g., 110, 120, 130, 140 and 150) includes a housing (e.g., 112, 122, 132, 142, and 152) defining a front face (e.g., 114, 124, 134, 144, and 154). Each housing defines a width that is dimensioned to host a pair of receptacles that are spaced apart with respect to each other. The width is generally selected so as to accommodate receptacle spacing of up to 3 pitch (3 p). Thus, each adapter is sized and shaped to be equal size and shape to a standard quad adapter. However, each adapter associated with the present disclosure includes only a single pair of receptacles spaced apart an appropriate pitch value (p) corresponding to an appropriate mating connector. For example, a 3 p connector will only mate and cooperate with a 3 p adapter.

Referring to FIG. 1, a plurality of exemplary connector assemblies and cooperating adapters associated with the present disclosure are shown. FIG. 1 illustrates several exemplary duplex connector assemblies adapted to mate with a corresponding adapter and communicate with a corresponding network. Each pair of connectors are spaced apart a unique pitch value (p). Exemplary connector assembly 10 includes a pair of individual connectors 14, referred to as connector subassemblies 14, extending outwardly with respect to a connector housing clip 11, and the subassemblies are spaced apart a pitch value of p=1, which will be referred to as a 1 p connector. In an exemplary embodiment, a duplex connector assembly includes a pair of side by side connector subassemblies defining a pitch value not equal to one as illustrated by exemplary connectors 20 (1.5 p), 30 (2 p), 40 (2.5 p), and 50 (3 p).

Accordingly, each uniquely spaced apart connector mates with an appropriately spaced adapter unit as illustrated in FIG. 1. FIG. 1 illustrates several exemplary duplex adapters formed as a quad width housing including only a pair of receptacles positioned in the front face of the housing. Each pair of receptacles is spaced apart a particular pitch value (p) and is adapted to receive and mate with only one appropriately spaced apart (i.e. pitched) duplex connector. Accordingly, adapter 110 (1 p) cooperates and/or mates with connector 10; adapter 120 (1.5 p) mates with connector 20; adapter 130 (2 p) mates with connector 30; adapter 140 (2.5 p) mates with connector 40; and adapter 150 (3 p) mates with connector 50. According to the present disclosure, pitch value (p) is defined such that "1 p" corresponds to the spaced apart distance between center lines passing through ferrules associated with an industry standard duplex connector/adapter.

Figure 2:
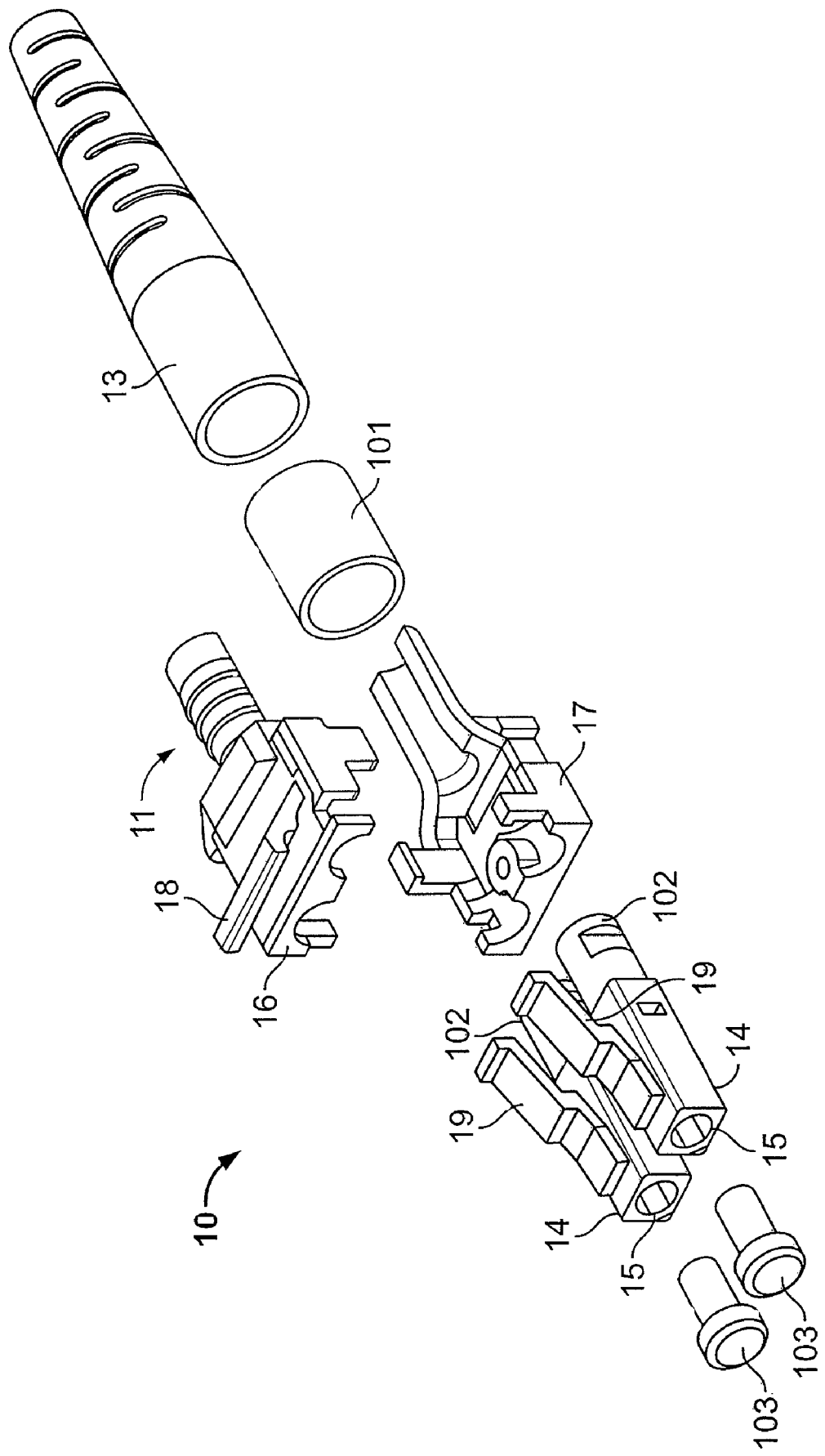
FIG. 2 is an exploded perspective view of an exemplary connector assembly.

FIG. 2 illustrates an exploded schematic of an exemplary connector assembly 10. Assembly 10 includes a pair of connector subassemblies 14. Each subassembly defines an inner surface surrounding a ferrule 15. In an exemplary embodiment, ferrule 15 is adapted to transmit and/or receive optical and/or data signals for communication with a network or an electronic device. The signal(s) travel across patch cord 12 illustrated in FIG. 1. Cord 12 extends rearwardly with respect to housing clip 11. At least a portion of cord 12 is surrounded by a flexible protective feature 13, often referred to as a boot 13. In an exemplary embodiment, boot 13 is a serrated boot as illustrated in FIGS. 1 and 2. Boot 13 is typically made from a flexible plastic material and is adapted to prevent undesired or destructive bending of cord 12.

The present disclosure provides for an exemplary embodiment such that each connector subassembly 14 includes a trigger feature 19 for locking the subassembly with respect to a mating receptacle. Trigger feature 19 must be depressed in order to release subassembly 14 from a mating receptacle. Trigger feature 19 is typically formed on a top surface of subassembly 14 extending diagonally and upwardly with respect to the top surface of subassembly 14. Ferrule housing 102 is typically positioned with respect to a rear side of subassembly 14. Ferrule 15 is securely mounted with respect to ferrule housing 102 and extends through an inner subassembly cavity defined by subassembly 14. In an exemplary embodiment, a pair of removable dust caps 103 can be utilized to substantially cover ferrules 15 when the connector assembly is not in use. Dust caps 103 are adapted to prevent ferrules 15 from accumulating dirt and/or dust when not in use. In an exemplary embodiment, each connector subassembly includes a push-pull latching mechanism (not shown) for inserting and securing the connector with respect to the adapter. A push-pull latching mechanism is typically utilized with respect to an MU connector and/or an SC connector.

Subassemblies 14 and corresponding ferrule housings 102 are securely mounted with respect to connector housing clip 11. Housing clip 11 includes an upper clip 18 and a lower clip 17 adapted to form an enclosure around a portion of cord 12 entering housing clip 11 through boot 13, subassemblies 14 and ferrule housings 102. In an exemplary embodiment, a crimp tube 101 is utilized to surround a rear portion of housing clip 11 to securely mount clip 11 with respect to boot 13. Crimp tube 101 is further effective in retaining any aramid yarn (typically a Kevlar strength member associated with the cable) with respect to the connector subassembly and housing clip. Upper clip 18 includes a clipping feature 16 formed with respect to a top surface of upper clip 18 and extending upwardly with respect to the top surface of upper clip 18. Clipping feature 16, often referred to as a thumb clip, is sized and shaped to simultaneously depress both trigger features 19 associated with the pair of subassemblies 14.

Exemplary connector assemblies 20, 30, 40, and 50 as shown in FIG. 1 include similar structural features of exemplary connector assembly 10 except each feature is sized and shaped to appropriately cooperate with each assemblies particular pitch value connector spacing. For example, connector assembly 50 is a 3 p assembly and thus will have a wider housing clip and thumb clip than a smaller pitched assembly.

Exemplary assemblies 10, 20, 30, 40 and 50 include a single unitary cord (e.g., cord 12 associated with assembly 10). Each cord includes at least two internal leads split within the housing clip and then terminated by individual ferrules. In an exemplary embodiment, the cord can be a zip cord. A zip cord typically includes two side by side independent cords integrally formed and adapted to be easily separated to be independently terminated. Exemplary assemblies 10', 20', 30' 40' and 50' include similar features as exemplary assemblies 10, 20, 30, 40 and 50 except for the inclusion of a zip cord rather than a single unitary cord. A zip cord embodiment separates the independent leads before being mounted with respect to the housing clip. Accordingly, two boots (one for each independent lead) are utilized and the housing clip is sized and shaped to receive two separated independent cords rather than one. A zip cord embodiment allows for installation of a non-removable housing clip in the field, thus significantly reducing risk of tampering and/or physical security breach. Moreover, an additional advantage associated with self field installation includes increased convenience associated with terminating a desired number of uniquely pitched connector assemblies without pre-ordering from a supplier.

Figure 3:
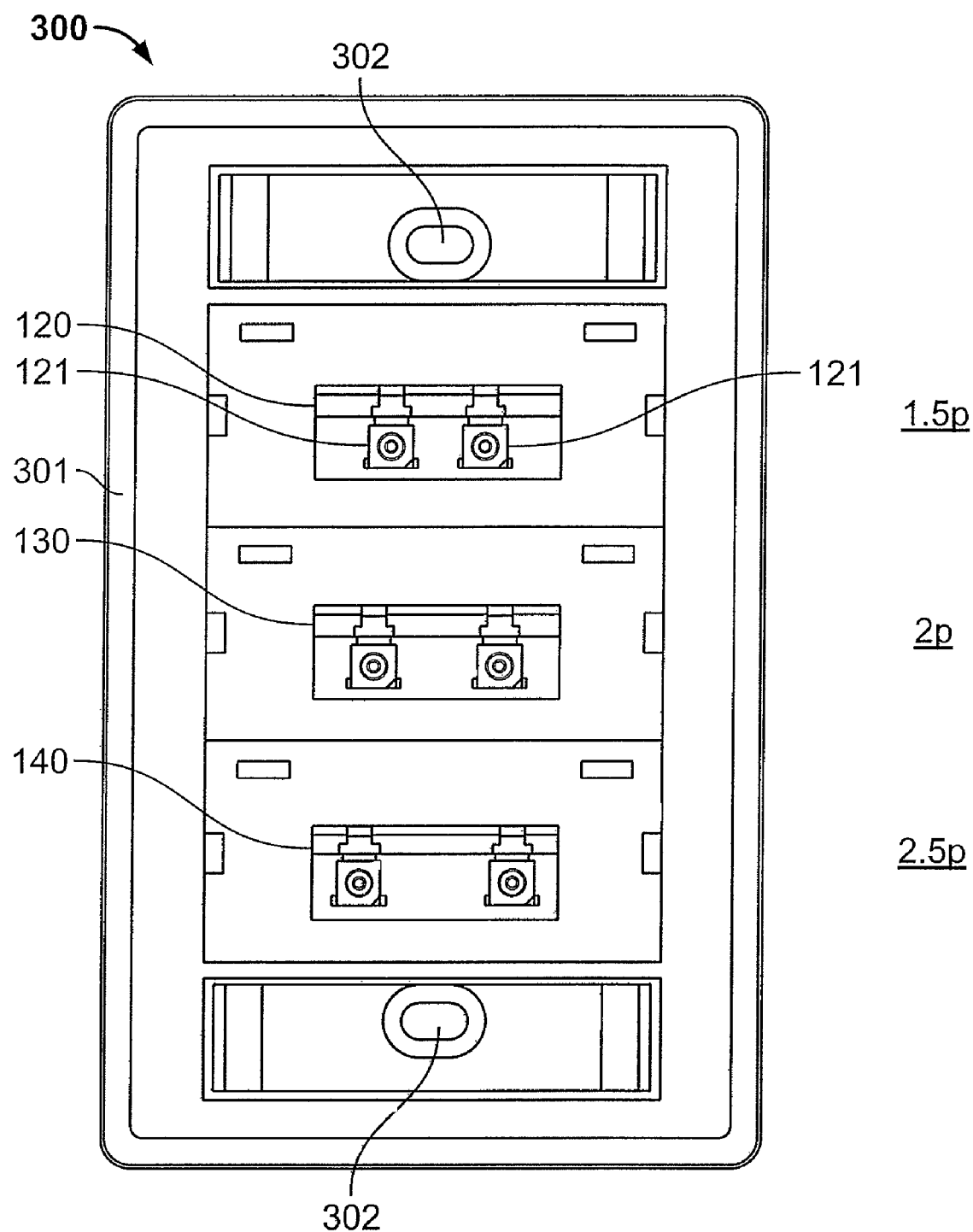
FIG. 3 is a schematic illustrating a multi-adapter embodiment associated with the present disclosure.

The present disclosure provides for systems including a plurality of adapters, such that each adapter includes a pair of uniquely spaced apart receptacles adapted to cooperate and/or mate with a corresponding appropriately pitched connector assembly. FIG. 3 illustrates an exemplary multi-adapter assembly 300 associated with the present disclosure. Assembly 300 includes a wall plate 301 adapted to be mounted onto a wall and host a plurality of quad width adapters. In an exemplary embodiment, wall plate 301 includes a pair of mounting apertures 302 adapted to receive a mounting feature such as a screw, a nut, a post, a bolt or a nail. In an exemplary embodiment, adapters associated with the present disclosure are included and/or utilized in a modular cassette system and/or a patch panel system. Exemplary connector assemblies can be included and/or utilized in a trunk cable systems, patch cable systems, and/or horizontal cabling systems.

In an exemplary embodiment, wall plate 301 hosts three quad width adapters. Each adapter includes a pair of uniquely pitched receptacles adapted to cooperate with an appropriately pitched duplex connector assembly. Adapter 120 (e.g., a 1.5 p adapter) includes a pair of receptacles 121 spaced apart a pitch value of p=1.5. Adapter 130 is a 2 p adapter and adapter 140 is a 2.5 p adapter. Each adapter will only mate with a similarly pitched connector assembly. Thus adapter 120 can mate with an exemplary connector 20 or 20' (e.g., a 1.5 p connector from FIG. 1), adapter 130 can mate with an exemplary connector 30 or 30', and adapter 140 can mate with an exemplary connector 40 or 40'.

Figure 4:
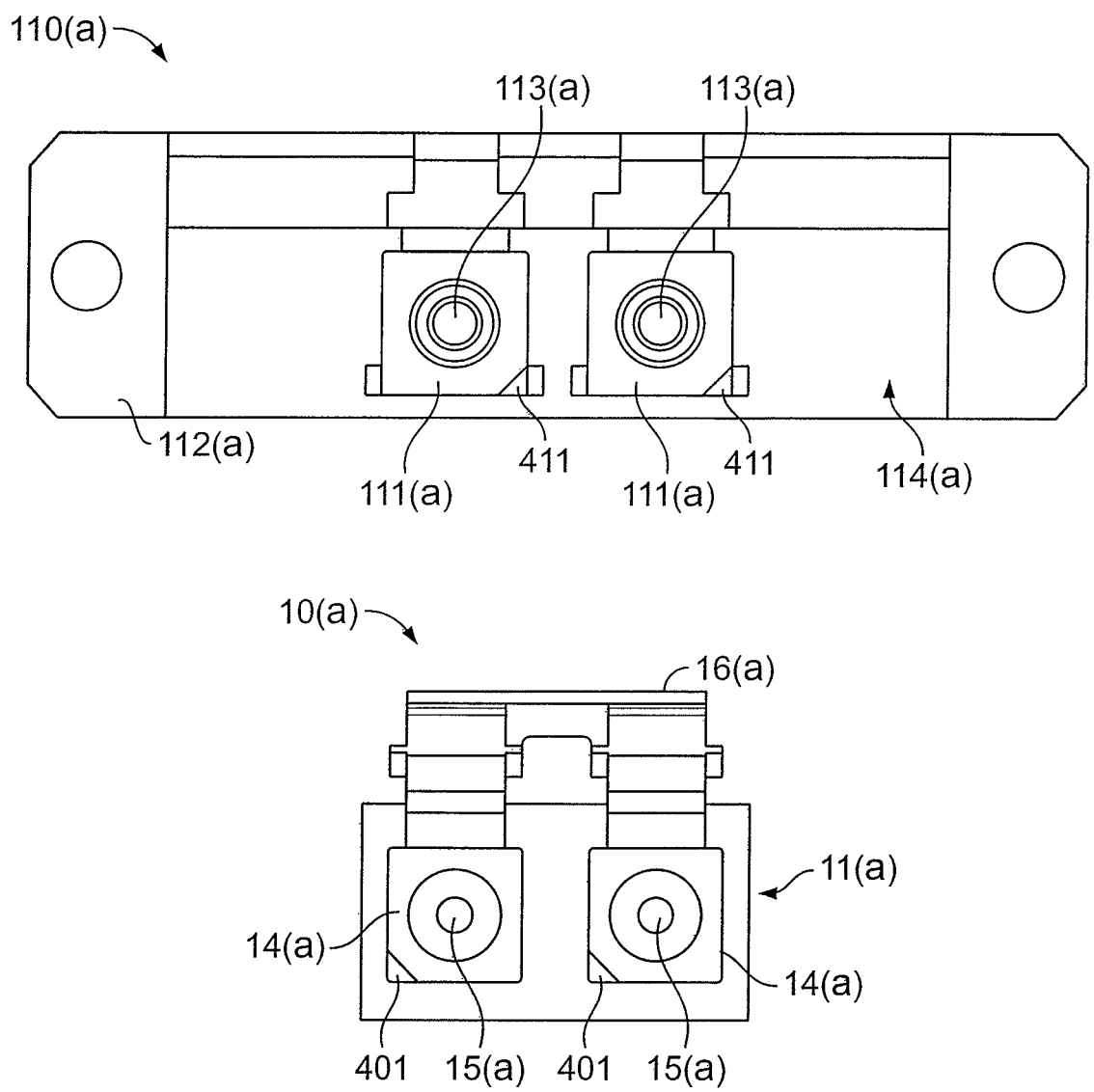
FIG. 4 is a front face view of an exemplary adapter and an exemplary connector assembly illustrating a boss and relief feature.

FIG. 4 illustrates a front face view of an exemplary 1 p adapter 110(*a*) and connector assembly 10(*a*) associated with the present disclosure. Adapter 10(*a*) includes a housing 112(*a*) defining a front face 114(*a*). Positioned within front face 114(*a*) is a pair of receptacles 111(*a*) spaced apart a pitch value p=1. Each receptacle 111(*a*) includes an internal alignment sleeve 113(a) adapted to receive a ferrule 15(a) associated with a 1 p connector assembly 10(a). In an exemplary embodiment, receptacles 111(a) each include a protruding boss feature 411 and connector subassemblies 14(a) each define a relief portion 401 adapted to allow mating of connector assembly 10(a) with adapter 10(a).

In an exemplary multi-adapter, each receptacle includes a protruding boss feature positioned in relatively identical positions with respect to the inner surface of the receptacle. A multi-adapter protruding boss feature embodiment prevents outside unauthorized patch cord connector assemblies from accessing secured networks. For example, a user may bring a unauthorized terminated patch cord assembly into a secure environment and attempt mating with an adapter associated with a secure network. However, since the adapter includes the boss feature, the unauthorized patch cord will be incapable of mating with the adapter unless it defines an appropriate relief. Thus, the system will not mate with any generic patch cord assembly and will only cooperate with specifically designed assemblies under the system owners control.

In an exemplary embodiment, each uniquely pitched connector assembly and corresponding adapter is uniquely distinguished by a visual identifier. Exemplary visual identifiers include but are not limited to color coding, alphanumeric coding, unique symbol coding, and the like. Each identifier represents a unique security access level and or network.

Configuration described for exemplary assemblies 10-50, and assemblies 10'-50' can also be applied to other communication connector assemblies including but not limited to: LC, MT-RJ, SC, MU, E2000, and LX.5.

Although the present disclosure has been described with reference to exemplary embodiments and implementations thereof, the disclosed systems and methods are not limited to such exemplary embodiments/implementations. Rather, as will be readily apparent to persons skilled in the art from the description provided herein, the disclosed systems and methods are susceptible to modifications, alterations and enhancements without departing from the spirit or scope of the present disclosure. Accordingly, the present disclosure expressly encompasses such modification, alterations and enhancements within the scope hereof.

What is claimed is:

1. A method for securing a plurality of communications channels, said method comprising:
 (a) providing a plurality of data outlets, each data outlet including a pair of receptacles, said receptacles spaced apart relative to one another by one of a plurality of pitches, wherein each data outlet is associated with one of a plurality of communications channels,
 (b) providing a patch cord connector assembly, said patch cord connector assembly including a patch cord terminated at least at one end by a duplex connector, said duplex connector including a pair of connector subassemblies and a connector housing clip, said connector subassemblies secured in fixed position relative to one another by the connector housing clip, said connector subassemblies spaced apart from one another by one of the plurality of pitches,
 (c) providing access to a permissible data channel of the plurality of data channels, wherein the pitch of the connector subassemblies of the patch cord connector assembly is substantially the same as the pitch of the receptacles of a data outlet associated with the permissible data channel, such that the patch cord connector assembly is capable of mating with the data outlet associated with the permissible data channel;
 (d) restricting access to a restricted data channel of the plurality of data channels, wherein the pitch of the connector subassemblies of the patch cord connector assembly is substantially different from the pitch of the receptacles of a data outlet associated with the restricted data channel, such that the patch cord connector assembly is incapable of mating with the data outlet associated with the restricted data channel.

2. The method according to claim 1, wherein each communication channel associated with each data outlet includes a pair of communication pathways, the pair of communication pathways corresponding to the pair of receptacles of the data outlet, wherein the pair of communication pathways includes an outgoing communication pathway and incoming communication pathway.

3. The method according to claim 1, wherein each communication channel associated with each data outlet is further associated with an information network.

4. The method according to claim 1, wherein the communication channels are optical communication channels.

5. The method according to claim 1, wherein the communication channels are electrical communication channels.

6. The method according to claim 1, wherein each of the receptacles of the plurality of adapters further includes a protruding boss feature and each of the subassemblies associated with the patch cord connector assembly defines a relief adapted to cooperate with a corresponding protruding boss feature.

7. The method according to claim 1, wherein each connector subassembly defines defining an inner cavity to allow a ferrule mounted with respect to one of a pair of ferrule housings to pass through the connector subassembly, and wherein the connector housing clip is adapted to enclose and securely position at least a portion of the terminated end of the patch cord and at least a portion of each of a pair of ferrule housings.

* * * * *